United States Patent [19]

Ankenbauer et al.

[11] Patent Number: 4,966,475
[45] Date of Patent: Oct. 30, 1990

[54] BEARING SUPPORT WITH ADDITIONAL AXIALLY RESILIENT RING

[75] Inventors: Gerhard Ankenbauer, Rotenburg; Oswald Bayer, Aidhausen; Jan De Boer, Madenhausen; Thomas Rasp, Schweinfurt, all of Fed. Rep. of Germany

[73] Assignee: FAG Kugelfischer Georg Schafer (KGaA), Fed. Rep. of Germany

[21] Appl. No.: 480,579

[22] Filed: Feb. 15, 1990

[30] Foreign Application Priority Data

Mar. 3, 1989 [DE] Fed. Rep. of Germany ....... 3906783

[51] Int. Cl.$^5$ ............................................. F16C 43/04
[52] U.S. Cl. ..................................... 384/584; 384/537
[58] Field of Search ............... 384/476, 537, 564, 584, 384/585

[56] References Cited

U.S. PATENT DOCUMENTS

| | | | |
|---|---|---|---|
| 2,368,549 | 1/1945 | Kendall | 384/537 |
| 4,213,660 | 7/1980 | Yasui et al. | 384/585 |
| 4,423,540 | 1/1984 | Hishida | 384/585 X |
| 4,848,938 | 7/1989 | Haas et al. | 384/585 X |

*Primary Examiner*—Thomas R. Hannon
*Attorney, Agent, or Firm*—Ostrolenk, Faber, Gerb & Soffen

[57] ABSTRACT

A bearing support in the form an aluminum die casting wherein an antifriction bearing ring is cast in the support. Axially adjacent one axial side of the bearing ring is disposed axially resilient ringlike part that is in the form of either a sheet metal ring or a spring washer. The part has a generally L-shaped or the like cross-section. The thickness of the cast bearing materials around the peripheries of the antifriction bearing ring and the resilient element next to it is about ⅓ to 1/5 of the thickness of the antifriction bearing ring.

9 Claims, 2 Drawing Sheets

BEARING SUPPORT WITH ADDITIONAL AXIALLY RESILIENT RING

BACKGROUND OF THE INVENTION

The invention relates to a bearing support for an antifriction bearing, with the antifriction bearing ring cast in place within the support.

Federal Republic of Germany application No. OS 24 49 455 discloses a pedestal or flange bearing housing having an incorporated self-aligning roller bearing outer ring. The outer rings are introduced into the casting molds, and casting is effected around the rings.

Pedestal and flange bearings are generally installed in agricultural machines and in systems which do not have to satisfy very high precision requirements. Therefore, self-aligning roller bearings, which permit compensation for errors in alignment, are also used.

With tapered roller bearings, such as those used, for example, in motor-vehicle transmissions, high precision is demanded for the bearing support into which the rings are installed. Therefore, the bearing seating places are first ground and the rings are then pressed into position. This is expensive and requires special self-aligning rings. (See, for example, Federal Republic of Germany application No. OS 36 42 463.) In addition, there is a problem with a fixed bearing seat under different temperatures and there is a danger of the deformation of the antifriction bearing rings.

Upon the casting of hot metal around antifriction bearings (as in Federal Republic of Germany Pat. No. 33 33 506), in addition to the requirement that the hardened antifriction bearing rings not experience any change in their hardness, there is a problem that the antifriction bearing rings which are inserted into the die casting mold are exposed to the mold closing force. In order to prevent ring deformation by the mold closing force, particularly in the case of bearing rings of asymmetrical partial cross-section (e.g. tapered roller bearings), narrow width tolerances of the rings are necessary, since the high mold closing forces act asymmetrically on the ring and tend to turn it around its center of gravity. In addition, these deformations are increased by the casting around them and the subsequent cooling and shrinking of the bearing support and are so to say, frozen in place.

SUMMARY OF THE INVENTION

The object of the present invention, therefore, is to create a bearing support of the aforementioned type which, with simple means and despite large tolerances, permits casting around without great change in shape, change in dimensions or change in structure particularly in the bearing rings.

A bearing support of the invention is preferably an aluminum die casting and the antifriction bearing ring, particularly the outer ring, is cast in place within the bore of the bearing support. Axially alongside the antifriction bearing ring there is an axially resilient part which is cast together with the antifriction bearing ring in the bearing support. In preferred embodiments, the axially resilient sheet metal ring may be of a partial cross-section of L- or Y-shape or even T-shape, enabling its resilient deformation. In an alternate embodiment, that additional ring may be in the form of a spring washer. The antifriction bearing ring may be asymmetrical in partial cross-section. The axially resilient sheet metal ring rests against the axial end of the possibly asymmetrical antifriction bearing ring in the region of its diameter facing the bearing support, that is toward the periphery of the bearing ring.

The bearing support is cast around the external peripheries of the antifriction bearing ring and of the sheet metal ring or washer, and additionally extends axially away from at least that side of the additional ring or washer that faces away from the antifriction bearing ring. In the axial region of the cast bearing support around the periphery of the antifriction bearing ring and the additional ring, the cast on bearing support is about ⅓ to 1/5 of the thickness of the antifriction bearing ring.

The axially resilient ring or spring washer rests against the axial end of the bearing ring preferably toward the radial periphery thereof, which is near where the cast material is cast over the peripheries of these elements, so that the axially resilient ring or spring washer provides the resilient support toward the periphery or outside of the bearing ring.

The axially resilient sheet-metal ring or equivalently functioning spring washer which is axially alongside the antifriction bearing ring takes up the mold closing forces elastically, conducts them to a noncritical point of the bearing and uniformly distributes them. Further, the shrinkage forces are also divided up. Further, still hot die casting material is kept away from the antifriction bearing ring.

By dimensioning the wall thickness of the bearing support in the region of the antifriction bearing ring as ⅓ to 1/5 the thickness of the bearing ring, disadvantageous effects of the liquid metal, which has a temperature of about 750° C., upon the casting, on the completed machined and hardened antifriction bearing ring are avoided.

This bearing support may be used with an antifriction bearing ring that is a tapered roller, self-aligning roller, barrel roller, angular contact ball or angular roller bearing ring.

Other objects and features of the invention will be explained with reference to an embodiment illustrated in the drawings.

DESCRIPTION OF THE PREFERRED EMBODIMENTS

Figure 1:
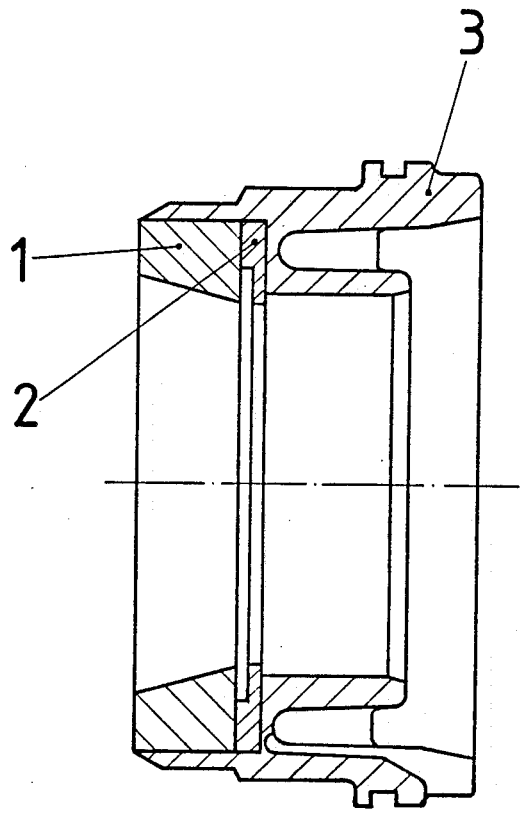
FIG. 1. shows a bearing support with a tapered-roller outer ring cast in place in accordance with the invention, seen in cross-section.

In FIG. 1, the tapered-roller outer ring 1 is of conventional design. Axially alongside the radially smaller diameter, thicker end of the ring 1 there is placed an axially resilient annular disk 2 with inner and outer radii approximating those of the neighboring end of ring 1. The disk 2 is peripherally flanged or axially thickened giving it an "L-Y" cross section. Alternately, it could be flanged to define a "T" cross-section. Preferably, the disk 2 is shaped so that it engages the ring 1 toward its periphery, near where the ring 1 is surrounded by the cast on material of the support 3.

Outer ring 1 and disk 2 are inserted into a die casting mold (not shown) and liquid aluminum die casting material is poured around them, covering the periphery of the ring 1 and the disk 2 and projecting axially beyond that axial end side of the disk 2 away from the ring 1 to define the bearing support 3.

Figure 2:
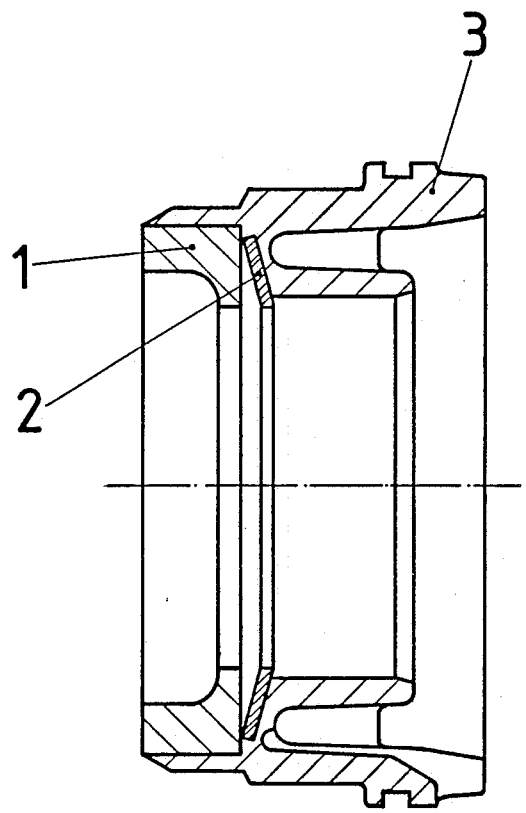
FIG. 2 shows a bearing support with angular ball-bearing outer ring cast in place, seen in cross-section.

In the embodiment FIG. 2, a similar axially spring resilient washer 2 rather than a disk 2 is arranged axially alongside the end of the angular ball-bearing outer ring 1. The spring washer also has inner and outer diameters generally corresponding to those of the neighboring end of the ring 1. The spring washer is oriented so as to contact the ring 1 near its periphery, where it contacts the cast on material of the support 3. The bearing support 3 is cast around the ring 1 and washer 2, as with the corresponding elements in the first embodiment, and covers over their peripheries.

In both embodiments, the axial part of the bearing support radially overlying the outer ring 1 and either the disk 2 or the washer 2 is about ⅓ to 1/5 the thickness of the antifriction bearing ring.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A bearing support and ring combination for an antifriction bearing comprising:
   a bearing support with a bore through it;
   an antifriction bearing ring disposed within the bore of the support, the ring having a first and a second axial side; the ring having a periphery;
   an axially resilient ring-shaped part disposed at the first axial side of the ring; the part having a periphery, a third axial side toward the first side of the ring and an opposite fourth axial side facing away from the ring;
   the bearing support being cast around the peripheries of the ring and the part and also being cast on the fourth side of the part, whereby the part is axially resilient between the bearing support on one axial side thereof and the antifriction bearing ring on the other side thereof.

2. The bearing support and ring combination of claim 1, wherein the support is an aluminum die casting.

3. The bearing support and ring combination of claim 1, wherein the axially resilient part has a partial cross-section that is generally L-shaped.

4. The bearing support and ring combination of claim 1, wherein the axially resilient part is shaped to contact the axial end of the bearing ring generally in the region of the outer diameter of the bearing ring and toward the bearing support.

5. The bearing support and ring combination of claim 1, wherein the axially resilient part comprises a spring washer.

6. The bearing support and ring combination of claim 5, wherein the spring washer is shaped and oriented such that the axially resilient part is shaped to contact the axial end of the bearing ring generally in the region of the outer diameter of the bearing ring and toward the bearing support.

7. The bearing support and ring combination of claim 1, wherein the antifriction bearing ring is asymmetrical in partial cross-section.

8. The bearing support and ring combination of claim 1, wherein the antifriction bearing ring is radially thicker and has a smaller inner diameter at the first axial side thereof toward the axially resilient part and has a greater inner diameter and is thinner away from the first axial side.

9. The bearing support and ring combination of claim 1, wherein the bearing support extends axially to a region thereof around the peripheries of the bearing ring and the axially resilient part and in that axial region around those peripheries, the bearing support has a thickness of about ⅓ to 1/5 of the radial thickness of the antifriction bearing ring.

* * * * *